Figure 1:
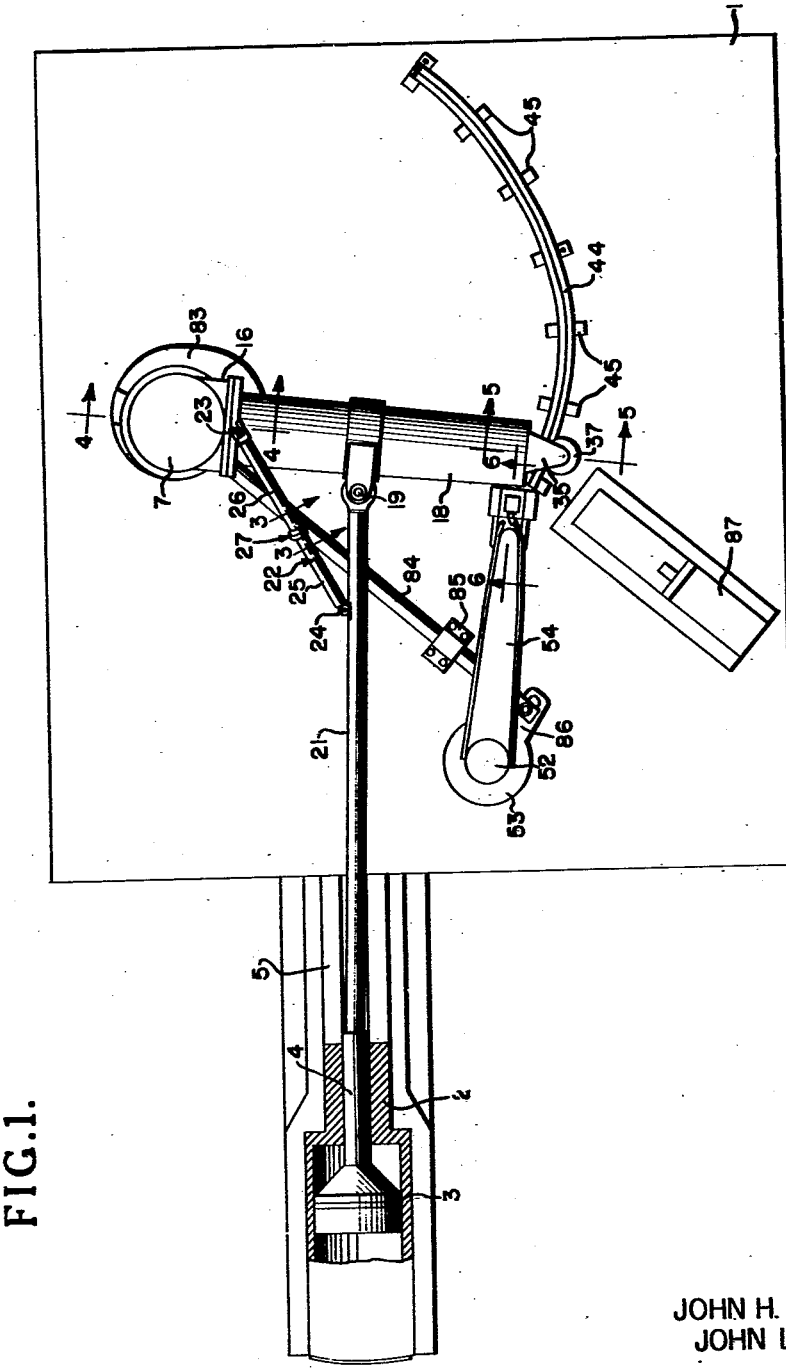

July 16, 1957    J. H. ARMSTRONG ET AL    2,799,163
ROTARY ACCELERATOR

Filed July 1, 1952    4 Sheets-Sheet 1

INVENTORS
JOHN H. ARMSTRONG
JOHN L. JONES

BY
*R. M. Hicks*
ATTORNEYS

July 16, 1957  J. H. ARMSTRONG ET AL  2,799,163
ROTARY ACCELERATOR
Filed July 1, 1952 4 Sheets-Sheet 2
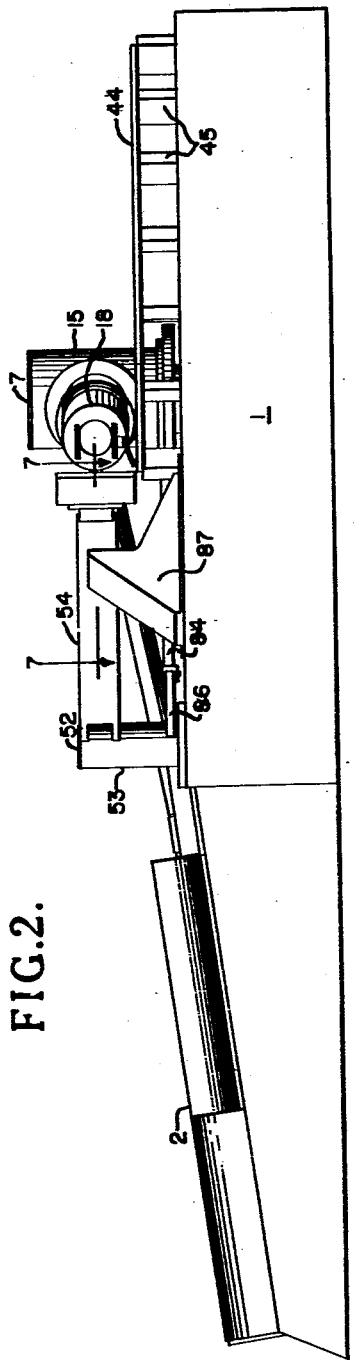
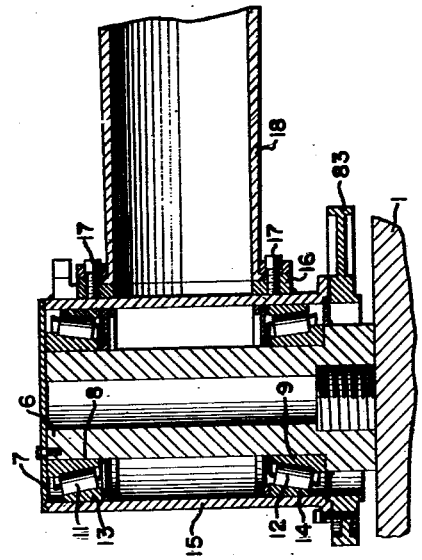
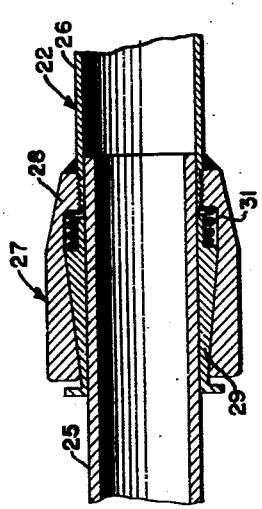
INVENTORS
JOHN H. ARMSTRONG
JOHN L. JONES
BY
*R. M. Hicks*
ATTORNEYS

INVENTORS
JOHN H. ARMSTRONG
JOHN L. JONES

INVENTORS
JOHN H. ARMSTRONG
JOHN L. JONES

United States Patent Office 2,799,163
Patented July 16, 1957

2,799,163

ROTARY ACCELERATOR

John H. Armstrong and John L. Jones, Silver Spring, Md.

Application July 1, 1952, Serial No. 296,774

10 Claims. (Cl. 73—167)

(Granted under Title 35, U. S. Code (1952), sec. 266)

The invention described herein may be manufactured and used by or for the Government of the United States of America for governmental purposes without the payment of any royalties thereon or therefor.

This invention relates to a rotary accelerator and more particularly to a means for simulating the long duration acceleration experienced by ordnance equipment such as fuzes in service use.

Heretofore, in determining the effects of high acceleration on ordnance equipment, it has been the practice to employ high powered air guns which fire the specimen undergoing test through an elongated tube. With such equipment, however, long duration acceleration tests are not possible since the length of tube required is impractical for laboratory usage. Another form of testing device for the same purpose is the centrifuge which also has limitations seriously affecting its practicability. In order to accurately simulate the effects of acceleration on fuzes in service use it is necessary to provide an apparatus in which the resultant acceleration component is along the longitudinal axis of the fuze body. In centrifuges in order to avoid any large cross axial acceleration component it is necessary to apply the accelerating force slowly which makes impossible the study of dynamic acceleration effects. Also the power required to operate centrifuges of a size sufficient to permit testing large objects makes such machines large and expensive. The prior art devices, therefore, have inherent disadvantages which make their use unsuitable for subjecting ordnance equipment to long duration high acceleration.

The present invention overcomes the difficulties hereinbefore referred to by providing a rotary accelerator which permits rapid acceleration but which avoids a large cross axial acceleration component on the specimen. This is accomplished by mounting the specimen on a turntable on the end of a rotatable arm. When the initial accelerating force is applied to the rotatable arm, the tangential accelerating component is the largest and the specimen is mounted so that its longitudinal axis coincides with this component. As the rotatable arm moves, the turntable with the specimen mounted thereon rotates so that the resultant of the tangential component and centripetal component of the acceleration is constant in value and is along the longitudinal axis of the specimen. In this manner an acceleration testing device is provided which permits long duration acceleration tests in which the accelerating force may be rapidly applied without the objectionable cross axial component present in the centrifuge.

An object of this invention is to provide a testing device which permits the determination of the effects of long duration rapidly applied acceleration on ordnance equipment.

Another object of this invention is the provision of a rotary accelerator in which the resultant acceleration component of the tangential and centripetal components is constant in value and lies along the longitudinal axis of the specimen tested.

Still another object of the present invention is to provide a rotary accelerator in which the specimen to be tested rotates through 90° with respect to the rotating arm during the period in which the accelerating force is being applied to the rotating arm whereby cross axial accelerating components on the specimen are eliminated.

Figure 5:
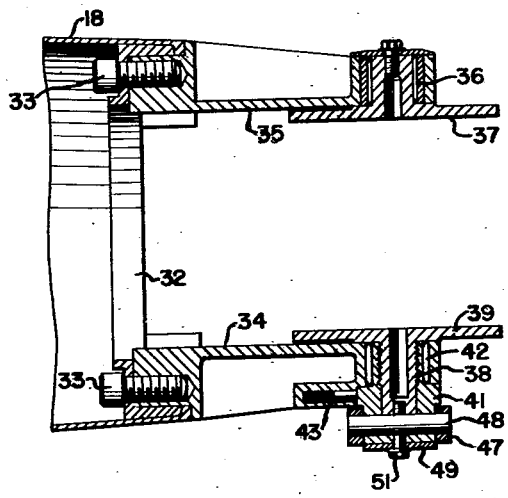
Figure 6:
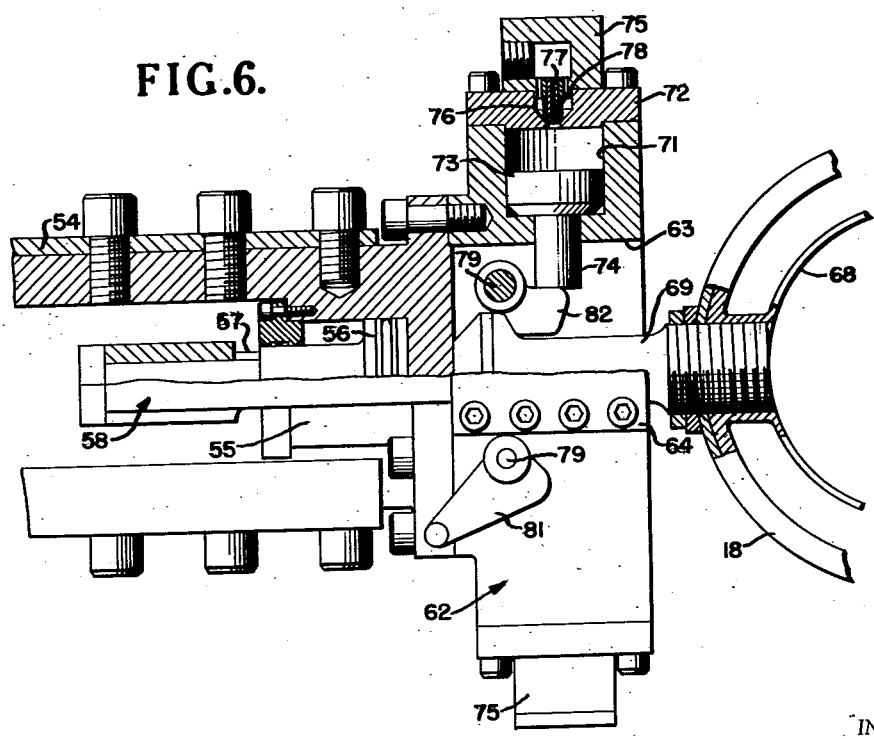
Figure 7:
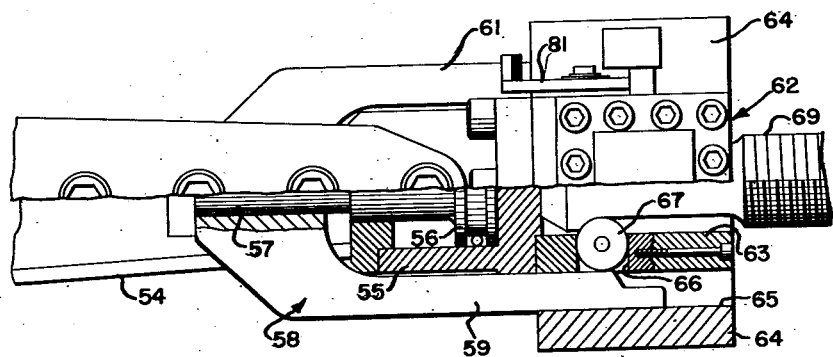
Figure 8:
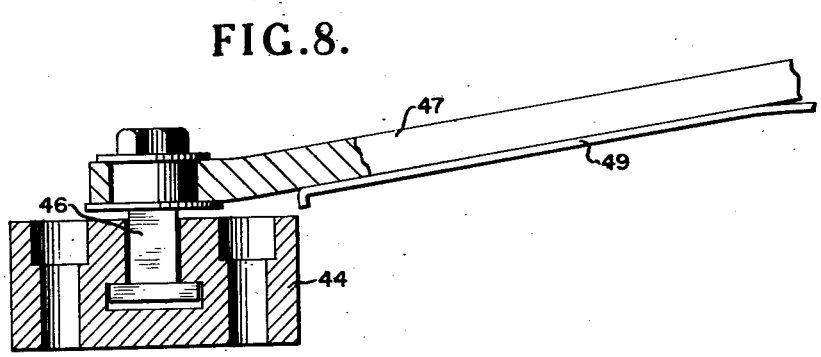

Other objects and many of the attendant advantages of this invention will be readily appreciated as the same becomes better understood by reference to the following detailed description when considered in connection with the accompanying drawings wherein:

Fig. 1 is a plan view partly in section of the invention herein disclosed;
Fig. 2 is a side elevation of Fig. 1;
Fig. 3 is a sectional view along the line 3—3 of Fig. 1;
Fig. 4 is a sectional view along the line 4—4 of Fig. 1;
Fig. 5 is a sectional view along the line 5—5 of Fig. 1;
Fig. 6 is a sectional view along the line 6—6 of Fig. 1;
Fig. 7 is a sectional view along the line 7—7 of Fig. 2;
Fig. 8 is a sectional view of the cam follower and link; and
Fig. 9 is a diagram of accelerating components.

Figure 9:
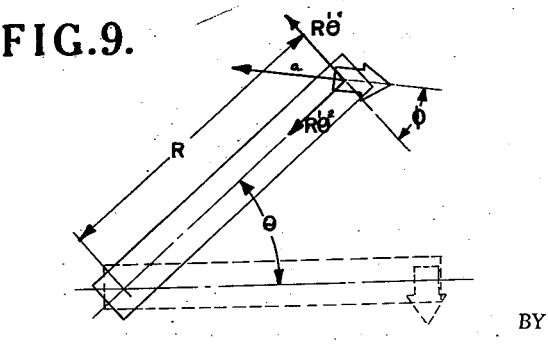

Referring now to the drawings wherein like numerals indicate like parts throughout the several views and more specifically to Fig. 9 a brief description of the theory involved in the operation of the present device will be undertaken. In a rotary accelerator it is apparent that while the accelerating force is being applied to the rotating arm a large tangential acceleration component is present which is at a maximum initially and decreases as the rotative speed of the arm increases until the aclerating force is withdrawn at which time this tangential component disappears. The other acceleration component of the rotating arm, the centripetal component, is initially zero and increases in value until the arm reaches a constant speed at which time this component has a constant maximum value.

A fuze when fired from a gun is subjected to a constant accelerating force along the longitudinal axis thereof. In order to accurately reproduce these conditions with a rotary accelerator it is necessary to rotate the fuze with respect to the rotating arm so that the resultant of the centripetal and tangential components of acceleration is always along the longitudinal axis of the fuze body. In Fig. 9 the rotating arm is shown in the intitial position in dotted lines and in intermediate position in full lines. The fuze to be tested is rotated from a position normal to the rotating arm to a position in alignment therewith while the accelerating force is being applied to the arm. The centripetal acceleration component is equal to $Rw^2$ where R equals the length of arm and $w$ equals the angular velocity. Since $$w = \frac{d\theta}{dt} = \dot{\theta}$$

the centripetal component may be expressed $R\dot{\theta}^2$ where $\theta$ is the angle shown in Fig. 9. The tangential acceleration component is equal to $R\alpha$ where $\alpha$ equals the angular acceleration. Since $$\alpha = \frac{d^2\theta}{dt^2} = \ddot{\theta}$$

this may be expressed $R\ddot{\theta}$. The resultant of these acceleration components is therefore equal to $\sqrt{R^2\ddot{\theta}^2 + R^2\dot{\theta}^4}$ which is set equal to the desired final centripetal acceleration, $R\dot{\theta}_f^2$, since it is desired to maintain the resultant a constant in value.

$$a_1 = R\dot{\theta}_f^2 = \sqrt{R^2\ddot{\theta}^2 + R^2\dot{\theta}^4}$$

or $$\dot{\theta}_f{}^4 = \ddot{\theta}^2 + \dot{\theta}^4$$

Integrating gives $$\dot{\theta}_f{}^t = \frac{1}{\sqrt{2}}\left[1.854 - F\left(45°, \cos\frac{\theta}{\dot{\theta}_f}\right)\right]$$

where F is an elliptic integral of the first kind. This equation may be solved for $\theta$ and $t$ expressed as a function of $\dot{\theta}_t$ by using standard integral tables. From these values the corresponding values of $\theta$ and $\dot{\theta}$ may be determined. It is found that the angular acceleration $\ddot{\theta}$ must be equal to zero when $\theta$ equals 45°. It can be seen therefore that $\phi$, the angle of the specimen with respect to the rotatable arm, must increase twice as fast as $\theta$, the angle of the rotatable arm with respect to the initial position since the specimen must rotate 90° during 45° of rotation of the arm.

Theoretically, therefore, the ideal mechanism would rotate the specimen to be tested through 90° during the time the accelerating force is being applied to the rotatable arm. However, it is apparent that the turntable upon which the specimen is mounted cannot be brought to an immediate stop after the 90° rotative movement since the decelerating forces acting on the specimen would be sufficiently large to introduce a large cross axial component on the specimen. Hence due to these practical considerations the mechanism is constructed so that the turntable rotates through 90° during 60° of the rotative movement of the arm, the major portion of the turntable motion being accomplished during the first 45° of rotation of the arm. In this manner the turntable is permitted to decelerate gradually thereby substantially eliminating the undesirable cross axial components.

Referring now to Fig. 1 the rotary accelerator is shown in plan view wherein it can be seen that there is provided a base 1 which is suitably bolted to the floor and upon which the operating elements are mounted. One end portion of this base is sloping (Fig. 2) and upon this sloping face is mounted the means for imparting rotary motion to the arm. An air cylinder 2 is suitably secured to the base and is provided with a piston 3 slidable therein. This piston has a rod 4 integral therewith which extends outwardly through one end of the air cylinder onto a guide tray 5 mounted on the base. The air cylinder is connected to a compressor of any suitable variety which is capable of compressing the air within the cylinder to 3000 p. s. i.

Mounted adjacent the center portion of the base 1 is a post 6 (Fig. 4) having a top plate 7 secured thereto. Around the outer surface of the post are disposed raceways 8 and 9 which support roller bearings 11 and 12. The outer raceways 13 and 14 for these roller bearings are mounted on the inner surface of a cylindrically shaped member 15 which as is readily apparent is free to rotate on post 6. Suitably secured to a circular plate 16 as by bolts 17 is an arm 18 upon the outer end of which is mounted the specimen to be tested. Pivoted on arm 18 at 19 (Fig. 1) is a strut 21 which in the initial or starting position of the mechanism extends into guide tray 5 in engagement with piston rod 4. There is further provided a locking strut 22 which is pivoted on arm 18 at 23 and on strut 21 at 24. Locking strut 22 comprises telescopic sections 25 and 26 (Fig. 3) which are provided with locking means 27 comprising a sleeve 28 secured to section 26 and a coacting segmented sleeve 29 slidably disposed on section 25. A spring 31 urges the cam surfaces of sleeves 28 and 29 into engagement. It can be seen that by virtue of this construction section 25 may be telescoped within section 26 but cannot be moved to an extended position unless the flange on sleeve 29 is manually forced inwardly to release section 25.

The outer end of rotatable arm 18 is provided with a turntable upon which the specimen to be tested is mounted. A retaining member 32 (Fig. 5) is disposed beneath a flange on the outer end of arm 18. Secured thereto as by bolts 33 are plates 34 and 35 the outer ends of which are provided with apertured bosses. Rotatably mounted on plate 35 by means of roller bearings 36 is the upper turntable 37 and the apertured boss on the lower plate 34 receives the shaft portion 38 of the lower turntable 39. Secured to this shaft portion is a sleeve 41 which is rotatable with turntable 39. Roller bearings 42 are disposed between sleeve 41 and the apertured boss of plate 34. A spring pressed detent 43 is mounted on plate 34 and is adapted to engage a recess (not shown) in sleeve 41 when the turntable rotates through 90° from the initial position. In this manner the turntable will be locked in the final position.

Mounted on the base 1 along the path of movement of the rotatable arm 18 is a cam track 44 (Fig. 1) which is supported by means of blocks 45 (Fig. 2). The cam track is shaped as shown in Fig. 8 and slidably disposed within this cam track is a follower 46 which is pivotally mounted on the end of link 47. Link 47 is pivoted by a pin 48 to sleeve 41 (Fig. 5). A leaf spring 49 fixedly mounted on the end of sleeve 41 by means of screw 51 serves to urge link 47 and follower 46 to a raised position out of engagement with the cam track after the follower leaves the cam track for a purpose to become more fully apparent hereinafter. The configuration of the cam track causes turntable 39 to rotate through 90° when arm 18 is rotated. The cam track extends through 60° of the path of movement of the arm 18 and is so constructed that the major portion of the 90° rotation of the turntable occurs during the first 45° of arm rotation. During the remaining 15° of the first 60° of arm rotation the turntable is decelerated relatively slowly to the 90° position wherein the spring pressed pin 43 locks the turntable.

There is further provided a means for locking the arm in the initial position and for releasing it for rotation. Mounted on base 1 is a post 52 and rotatably disposed around this post is a sleeve 53 having arm 54 fixed thereto. The outer end of the arm 54 has secured thereto a cylinder 55 (Fig. 7) having slidably disposed therein a piston 56 and piston rod 57. This piston rod extends outwardly through an opening in the cylinder and securely mounted on the outer end thereof is a yoke 58 having arms 59 and 61 extending forwardly therefrom. Mounted on the end of cylinder 55 is a block 62 which is provided with a central bore or port 63 extending therethrough. Secured to each side of block 62 is a guide block 64 having a channel 65 therein. Within the wall of the block 62 on each side of port 63 there is provided a slot 66 having a roller 67 slidably disposed therein. In Fig. 7 only one of these slots and rollers is shown but it is apparent that the construction of both sides of block 62 is identical.

Mounted within arm 18 is a reinforcing rib 68 (Fig. 6) and screwed into arm 18 and this reinforcing rib is a release pin 69. This release pin is adapted to fit within the bore 63 of block 62 in the initial or starting position of the arm 18. In Fig. 6 there is shown the means for retarding the acceleration of the arm 18.

If the accelerating force were applied to the arm suddenly, undesirable vibrations would be present in the arm whereby the effectiveness of the acceleration test would be hampered. In order to avoid this possibility the hereinafter described means is provided. Since the retarding means located within the upper and lower portions of block 62 are identical, only the elements within the upper portion of the block are shown and described in detail. The upper surface of block 62 is provided with a bore 71 (Fig. 6) which is closed by a plate 72 thereby forming a chamber within which is slidably disposed a piston 73 having a piston rod 74 integral therewith. Mounted on the upper surface of plate 72 is an apertured member 75 having openings therein in alignment with a port 76 in plate 72. Slidably disposed within port 76 is a valve 77 having an aperture 78 therethrough and this valve is spring urged to a closed position. The structure within the lower portion of block 62 is identical. Rotatably mounted in the walls of block 62 and extending through bore 63 are shafts 79 on the outer ends of which are fixedly mounted crank arms 81 (one shown). Fixed on shafts 79 within bore 63 are retarder elements 82 (one shown) which engage release pin 69 and rod 74. The operation of the retarder means will be hereinafter described in detail.

There is further provided means for pivoting the arm 54 to an inoperative position. Mounted on cylinder 15 and adapted to rotate therewith is a cam 83 (Figs. 1 and 4) and coacting with this cam is a follower 84 slidably supported by brackets 85 on base 1. The outer end of follower 85 is pivoted to a crank arm 86 which is fixed to sleeve 53. Mounted on base 1 is a stop block 87 (Figs. 1 and 2). It is apparent that as arm 18 is rotated cam 83 will force follower 84 outwardly thereby pivoting arm 54 to an inoperative position abutting stop block 87.

The operation of the presently disclosed apparatus will now be described in detail. A fuze or other specimen to be tested is fixedly mounted between the upper and lower turntables 37 and 39 (Fig. 5) with the longitudinal axis of the specimen perpendicular to the longitudinal axis of the arm 18. The air within cylinder 2 is then compressed and this force is transmitted through piston 3, rod 4 and strut 21 to arm 18 which is held in the initial position by the release and retarding means mounted on arm 54. Compressed air is supplied to the chambers formed by bores 71 (Fig. 6) through the apertures 78 in valves 77. When it is desired to release arm 18 for rotation, compressed air is forced within cylinder 55 in front of piston 56 which is thereby moved rearwardly. The movement of piston 56 and piston rod 57 causes yoke 58 to move rearwardly whereby the rollers 67 (Fig. 7) are freed for movement into the recessed portions of arms 59 and 61. As the arm 18 begins to move, release pin 69 forces rollers 67 outwardly and pivots retarder elements 82 forcing pistons 73 inwardly in the cylinders formed by bores 71. It can be seen that the rotary motion of arm 18 will be retarded by the length of time required for elements 82 to be pivoted to a position freeing pin 69. The valves 77 will lift when the pressure within the cylinders reaches a certain predetermined value so that when pin 69 is released the pressure will not be sufficient to damage pistons 74 as they return to the normal position.

As the arm 18 begins to rotate, the turntables rotate the specimen with respect to the arm due to the coaction of cam track 44, follower 46 and link 47. The accelerating force on the arm supplied through piston rod 4 is applied during the first 45° of rotation of the arm after which strut 21 leaves guide tray 5. The motion of strut 21 causes sections 25 and 26 to telescope after the strut has left the guide tray and locking means 27 serves to retain strut 21 in an inoperative position. The cam track 44 extends through 60° of the path of movement of the arm 18 but the major portion of the 90° rotation of the turntables occurs during the first 45° of arm rotation, the remaining portion of the cam track serving to decelerate the turntables at a comparatively slow rate. The cam track is open ended so that after the arm 18 has rotated through 60° the follower 46 leaves the track and spring 49 forces follower 46 and link 47 to an inoperative position. As the arm continues to rotate, cam 83 (Fig. 1) urges follower 84 outwardly whereby arm 54 is pivoted to an inoperative position. It is apparent that the arm 18 freely rotates at a constant speed limited only by friction and windage and may be brought to a stop by any conventional braking means applied to cylinder 15.

To reset the device follower 46 is manually inserted within cam track 44 as arm 18 is rotated to the initial position. Release arm 54 is pivoted to its original position and release pin 69 on arm 18 is reinserted in bore 63 by manually operating crank arms 81 (Fig. 6) to pivot retarder elements 82 to an inoperative position. By returning piston 56 to its original position arms 59 and 61 force rollers 67 to a position in engagement with release pin 69. Locking means 27 is released by manually forcing sleeve 29 inwardly and strut 21 is returned to a position within guide tray 5 in engagement with piston rod 4.

It is apparent therefore that there has been provided a rotary accelerator which accurately reproduces the acceleration force experienced by ordnance equipment during service use. The specimen mounted on the turntable is rotated during the time the accelerating force is being applied to the arm in such a manner that the resultant of the tangential and centripetal components of acceleration is constant in value and is maintained along the longitudinal axis of the specimen.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. In a device of the class disclosed, a pivotally mounted arm, means for imparting an accelerating force to said arm through 45° of rotary movement of said arm, a turntable mounted for rotation on the end of said arm, and cam means adapted to rotate said turntable through 90° during 60° of the rotary movement of said arm, the major portion of the rotation of said turntable being accomplished during the first 45° of rotary movement of said arm.

2. A rotary acceleration testing device comprising, a base, an arm rotatably mounted on said base, means for accelerating said arm to a predetermined speed during 45° of rotative movement of said arm, a turntable rotatably mounted on the end portion of said arm, cam means fixedly mounted on said base, a cam follower engaging said cam means, and link means extending between said turntable and said cam follower whereby upon actuation of said accelerating means said arm rotates and said cam means causes rotation of said turntable with respect to said arm.

3. A rotary acceleration testing device comprising, a base, an arm rotatably mounted on said base, means for accelerating said arm to a predetermined speed during 45° of rotative movement of said arm, a turntable rotatably mounted on the end portion of said arm, a cam track mounted on said base and extending through an arc of 60° along the path of movement of said arm, a follower slidable in said cam track, and link means connecting said follower and said turntable.

4. A rotary acceleration testing device comprising, a base, an arm rotatably mounted on said base, an air cylinder mounted on said base and having an opening in one end thereof, a piston slidably disposed within said cylinder and having a piston rod extending outwardly through said opening, a strut pivotally mounted on said arm and adapted to extend into engagement with said piston rod, and locking means pivotally mounted on said arm and on said strut whereby when said piston moves in said cylinder in response to air pressure thereagainst a thrust is exerted on said strut causing said arm to rotate and causing said locking means to retain the strut in a displaced position.

5. A rotary acceleration testing device comprising, a base, an arm rotatably mounted on said base, an air cylinder having an opening in one end thereof, a piston slidable in said cylinder and having a piston rod integral therewith extending through said opening, a guide tray supporting said piston rod, a strut pivotally mounted on said arm and having the end thereof initially resting in said tray in engagement with said piston rod, locking means including telescopic rods pivotally mounted on said arm and said strut, and means for actuating said piston whereby a thrust is exerted against said strut to rotate said arm and said locking means functions to retain said strut in a displaced position.

6. In a device of the class described, a rotatably mounted arm, a turntable rotatably mounted on the end of said arm, means for accelerating said arm to a predetermined speed, means for controlling the rate of acceleration, and cam means for rotating said turntable 90° with respect to said arm during the first 60° of rotative movement of said arm, said accelerating means being applied to said arm during the first 45° of rotative movement of said arm, said turntable rotating with respect to the arm at substantially twice the rate at which the arm rotates whereby the resultant acceleration component at the pivot point of the turntable of the tangential and centripetal acceleration components is constant in value and lies along the same line on the turntable.

7. A rotary accelerator comprising, in combination, a base, an arm rotatably mounted on said base, a turntable mounted on said arm, an air cylinder having an opening in one end thereof mounted on said base, a piston slidable in said cylinder and having a piston rod integral therewith extending through said opening, a strut pivotally mounted on said arm normally in contact with said piston rod, a release link mounted on said arm, release means including retarding means normally engaging said link, whereby upon pressurizing said air cylinder said arm may be accelerated at a rate determined by said retarding means upon actuation of said release means.

8. A rotary accelerator comprising, in combination, a base, an arm, means rotatably mounting said arm on said base, a turntable rotatably mounted on the end portion of said arm, means for accelerating said arm to a predetermined speed, release means pivotally mounted on said base and adapted to retain said arm in an initial position, means for rotating said turntable with respect to said arm as the arm accelerates, a cam disposed on said arm mounting means, and follower means pivotally mounted on said release means and extending into engagement with said cam whereby upon actuation of said accelerating means and release means said arm is accelerated and said release means is pivoted to an inoperative position by said cam and follower means.

9. A rotary acceleration testing device comprising, a base, an arm rotatably mounted on said base, a turntable rotatably mounted on the end portion of said arm, an open ended cam track mounted on said base and extending through an arc of 60° along the path of movement of said arm, a follower adapted to slide within said cam track, link means pivotally interconnecting said follower and said turntable, spring means secured to said link and said turntable, and means for accelerating said arm during 45° of rotative movement of said arm to a constant predetermined speed whereby upon actuation of said accelerating means said arm rotates and said turntable rotates 90° with respect to said arm and said spring means raises said link means and follower to an inoperative position after the follower has left said cam track to permit free rotation of said arm.

10. A rotary acceleration testing device comprising, in combination, a base, force applying means mounted on said base, an arm, means rotatably mounting said arm on said base, a strut having one end thereof pivotally mounted on said arm and having the other end thereof initially in engagement with the force applying means, locking means including telescopic rods pivotally interconnecting said strut and said arm, a turntable rotatably mounted on the end portion of said arm, a cam trackway mounted on said base and extending along 60° of the path of movement of said arm, a follower adapted to slide within said trackway, means interconnecting said follower and said turntable whereby upon rotation of said arm said turntable rotates 90° with respect to said arm, means retaining said arm in an initial position, said last-named means being pivotally mounted on said base, a cam disposed on said arm mounting means, and a thrust transmitting means engaging said cam and pivotally mounted on said retaining means whereby upon rotation of said arm said cam and said thrust transmitting means pivot said retaining means to an inoperative position.

References Cited in the file of this patent
UNITED STATES PATENTS

| | | |
|---|---|---|
| 1,829,311 | Tea | Oct. 27, 1931 |
| 2,223,647 | Stumpf | Dec. 3, 1940 |
| 2,301,967 | Nosker et al. | Nov. 17, 1942 |
| 2,355,092 | Meister | Aug. 8, 1944 |
| 2,366,266 | Kallenbach | Jan. 2, 1945 |
| 2,465,437 | Engelhardt | Mar. 29, 1949 |
| 2,573,830 | Boykin | Nov. 6, 1951 |
| 2,631,453 | Larsen et al. | Mar. 17, 1953 |